(12) United States Patent
Goto et al.

(10) Patent No.: US 8,833,526 B2
(45) Date of Patent: Sep. 16, 2014

(54) ELECTRIC BRAKE APPARATUS

(75) Inventors: Daisuke Goto, Yokohama (JP);
Hirotaka Oikawa, Yokohama (JP);
Takuya Usui, Yokohama (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 167 days.

(21) Appl. No.: 13/361,017

(22) Filed: Jan. 30, 2012

(65) Prior Publication Data

US 2012/0193177 A1 Aug. 2, 2012

(30) Foreign Application Priority Data

Jan. 31, 2011 (JP) ................................. 2011/018908

(51) Int. Cl.
| | | |
|---|---|---|
| F16D 66/02 | (2006.01) | |
| F16D 65/18 | (2006.01) | |
| F16D 65/56 | (2006.01) | |
| B60T 13/74 | (2006.01) | |
| B60T 17/22 | (2006.01) | |
| F16D 66/00 | (2006.01) | |
| F16D 125/36 | (2012.01) | |
| F16D 121/24 | (2012.01) | |
| F16D 125/50 | (2012.01) | |

(52) U.S. Cl.
CPC ............... B60T 13/741 (2013.01); F16D 65/18 (2013.01); F16D 65/567 (2013.01); *F16D 2066/005* (2013.01); *F16D 2066/003* (2013.01); *F16D 2125/36* (2013.01); *F16D 2066/006* (2013.01); *F16D 2121/24* (2013.01); *F16D 2125/50* (2013.01); B60T 17/221 (2013.01)
USPC ................ 188/1.11 L; 188/1.11 E; 188/71.8; 188/72.1; 188/156; 188/158

(58) Field of Classification Search
USPC .............. 188/161, 156, 158, 162, 71.8, 71.9, 188/72.1, 72.8, 1.11 W, 1.11 L
See application file for complete search history.

(56) References Cited

U.S. PATENT DOCUMENTS

| | | | | | |
|---|---|---|---|---|---|
| 5,957,246 | A | * | 9/1999 | Suzuki | 188/72.1 |
| 6,158,557 | A | * | 12/2000 | Leitermann et al. | 188/71.8 |
| 6,464,308 | B2 | * | 10/2002 | Kubota | 303/20 |
| 7,565,954 | B2 | * | 7/2009 | Kawahara et al. | 188/1.11 L |
| 7,597,407 | B2 | * | 10/2009 | Yamaguchi et al. | 303/20 |
| 8,336,969 | B2 | * | 12/2012 | Sano et al. | 303/191 |
| 8,348,024 | B2 | * | 1/2013 | Yamaguchi et al. | 188/72.3 |
| 2008/0029355 | A1 | * | 2/2008 | Kawahara et al. | 188/72.1 |
| 2008/0059023 | A1 | * | 3/2008 | Ueno et al. | 701/36 |
| 2009/0032342 | A1 | * | 2/2009 | Yamaguchi | 188/72.3 |
| 2010/0300816 | A1 | * | 12/2010 | Linke et al. | 188/1.11 L |
| 2011/0246039 | A1 | * | 10/2011 | Takeda et al. | 701/70 |

FOREIGN PATENT DOCUMENTS

| | | | |
|---|---|---|---|
| JP | 2003-106355 | | 4/2003 |
| JP | 2008184023 | A * | 8/2008 |

* cited by examiner

*Primary Examiner* — Thomas J Williams
*Assistant Examiner* — Mariano Sy
(74) *Attorney, Agent, or Firm* — Wenderoth, Lind & Ponack, L.L.P.

(57) ABSTRACT

An electric brake apparatus compares an estimated thrust force corresponding to a predetermined rotational position of an electric motor, which is calculated from an electric current/thrust force conversion function, with a reference thrust force based on a rotational position/thrust force table indicating a relationship between the rotational position of the electric motor and a thrust force of a piston to correct and update the electric current/thrust force conversion function, thereby maintaining a predetermined control accuracy despite wear of a brake pad and other changes over time.

20 Claims, 15 Drawing Sheets

ELECTRIC BRAKE APPARATUS

BACKGROUND OF THE INVENTION

1. Field of the Invention

The present invention relates to an electric brake apparatus for use in braking of a vehicle.

2. Related Art

Electric brake apparatuses, which function to brake a vehicle with use of an electric motor as a driving source, calculate electric current that is contributive only to generation of a thrust force for a linear motion, i.e., thrust force contributive electric current by subtracting, for example, electric current ripples, and electric current corresponding to a resistance against a sliding motion including viscosity of grease at the mechanical portion actuated by the electric motor (viscosity/frictional torque component current) from electric current for driving the electric motor, and then estimate a thrust force by multiplying this thrust force contributive electric current by a function determined from the characteristics of the mechanical portion and the motor, such as an electric current/thrust force conversion function. For example, refer to Japanese Patent Public Disclosure No. 2003-106355. Use of the thus-calculated estimated thrust force eliminates the necessity of a thrust force sensor configured to directly detect a thrust force in some electric brake apparatuses, which thereby can control a brake force without using a sensor.

According to the above-described conventional technique, although the electric brake apparatus can perform control without using any thrust force sensor, the electric brake apparatus may become unable to accurately calculate an estimated thrust force value due to a change in the mechanical portion over time. If this state occurs at left wheel and right wheel sides, this may result in a reduction in the vehicle stability at the time of a brake operation.

SUMMARY OF THE INVENTION

An object of the present invention is to provide an electric brake apparatus capable of maintaining predetermined control accuracy despite a change over time.

According to an aspect of the present invention, an electric brake apparatus includes a caliper configured to move a pressing member by an electric motor via a transmission mechanism, to cause the pressing member to press a brake pad against a disk rotor, a control unit configured to control the electric motor based on a thrust force instruction value of the pressing member which is calculated in response to a control instruction signal, a rotational position detection unit configured to detect a rotational position of the electric motor, and an electric current detection unit configured to detect electric current flowing through the electric motor. The control unit comprises a thrust force estimation unit configured to estimate a thrust force of the pressing member from the electric current flowing through the electric motor based on an electric current/thrust force conversion function, which defines a relationship between the electric current flowing through the electric motor and the thrust force of the pressing member, and an electric current/thrust force conversion function update unit configured to correct and update the electric current/thrust force conversion function by comparing an estimated thrust force corresponding to a predetermined rotational position of the electric motor, which is estimated by the thrust force estimation unit, and a reference thrust force corresponding to the predetermined rotational position based on the relationship between the rotational position of the electric motor and the thrust force.

DETAILED DESCRIPTION OF THE INVENTION

First Embodiment

Figure 1:
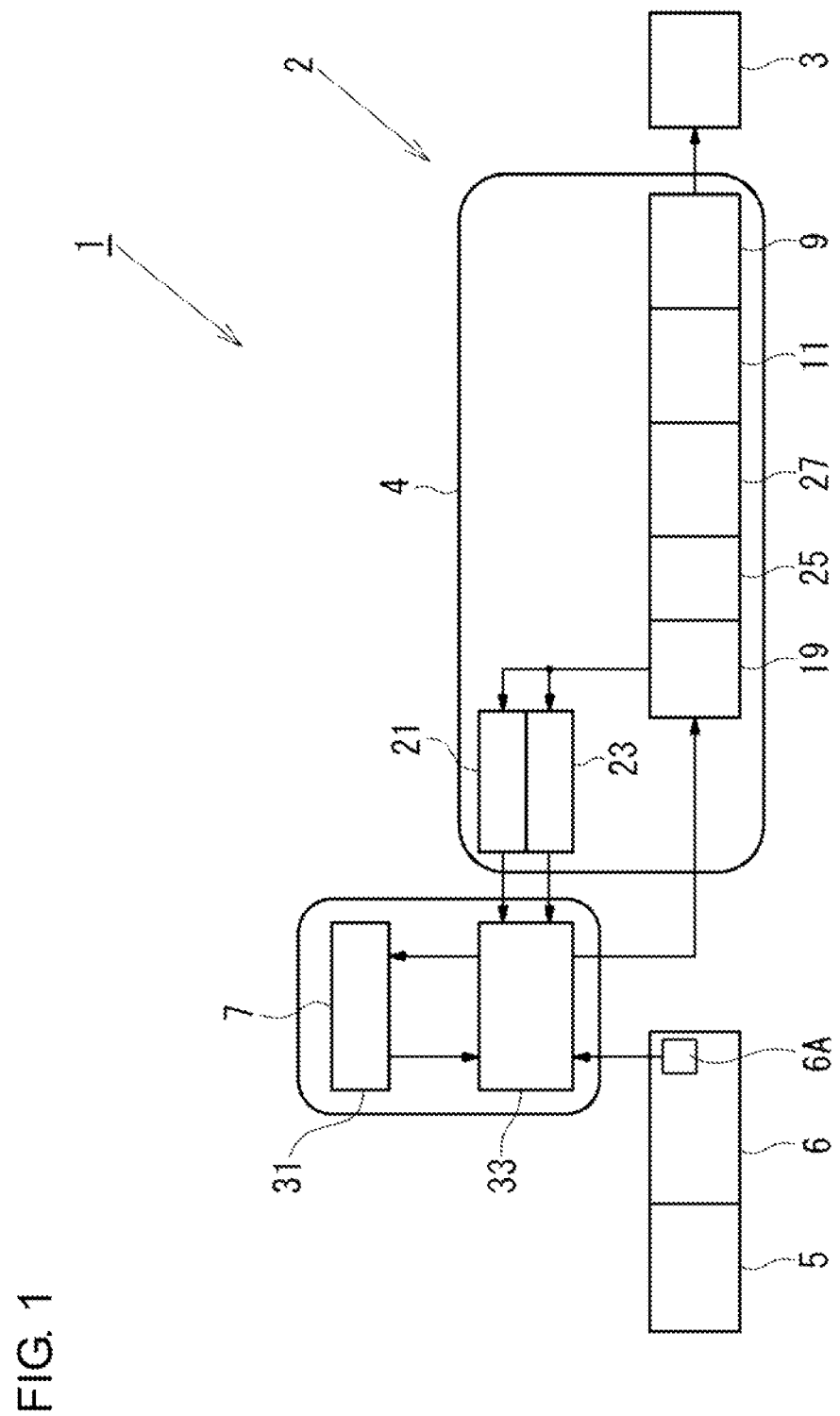
FIG. 1 is a block diagram schematically illustrating a configuration of an electric brake apparatus according to a first embodiment of the present invention.

In the following, an electric brake apparatus according to a first embodiment of the present invention will be described with reference to the accompanying drawings. FIG. 1 is a block diagram illustrating an overall configuration of an electric brake apparatus according to the present embodiment. As illustrated in FIG. 1, the electric brake apparatus 1 according to the present embodiment includes electric calipers 2 (only one of them illustrated) respectively disposed at the front, rear, right, left wheels of an automobile which is one example of a vehicle, and a controller 7 (control unit) configured to supply a control signal to the electric calipers 2 based on input signals from various kinds of sensors configured to detect vehicle conditions such as a vehicle speed and a vehicle acceleration. The controller 7 receives operation information (for example, a stroke and an operation force) of a brake pedal 5, which is detected by an operation sensor 6A. The operation sensor 6A is installed in a stroke simulator 6. The stroke simulator 6 is connected to a brake pedal 5 for allowing the brake pedal 5 to have a stroke to apply an appropriate operation force. Further, power is supplied from a power source (not illustrated) such as a battery to the above-described devices mounted in the vehicle such as the electric calipers 2, the controller 7, the operation sensor 6A, and the stoke simulator 6. The controller 7, and the electric calipers 2 and the above-described various kinds of sensors are connected to each other via a network (CAN) installed in the vehicle and an electric signal line, so as to be able to receive and transmit a control signal and a detection signal therebetween. The operation sensor 6A may be embodied by, for example, a stroke sensor configured to detect a stroke of the brake pedal 5, or a pressing force sensor configured to detect a pressing force. Further, the operation sensor 6A does not necessarily have to be installed in the stroke simulator 6, and may be mounted on, for example, the brake pedal 5, separately from the stroke simulator 6.

Figure 2:
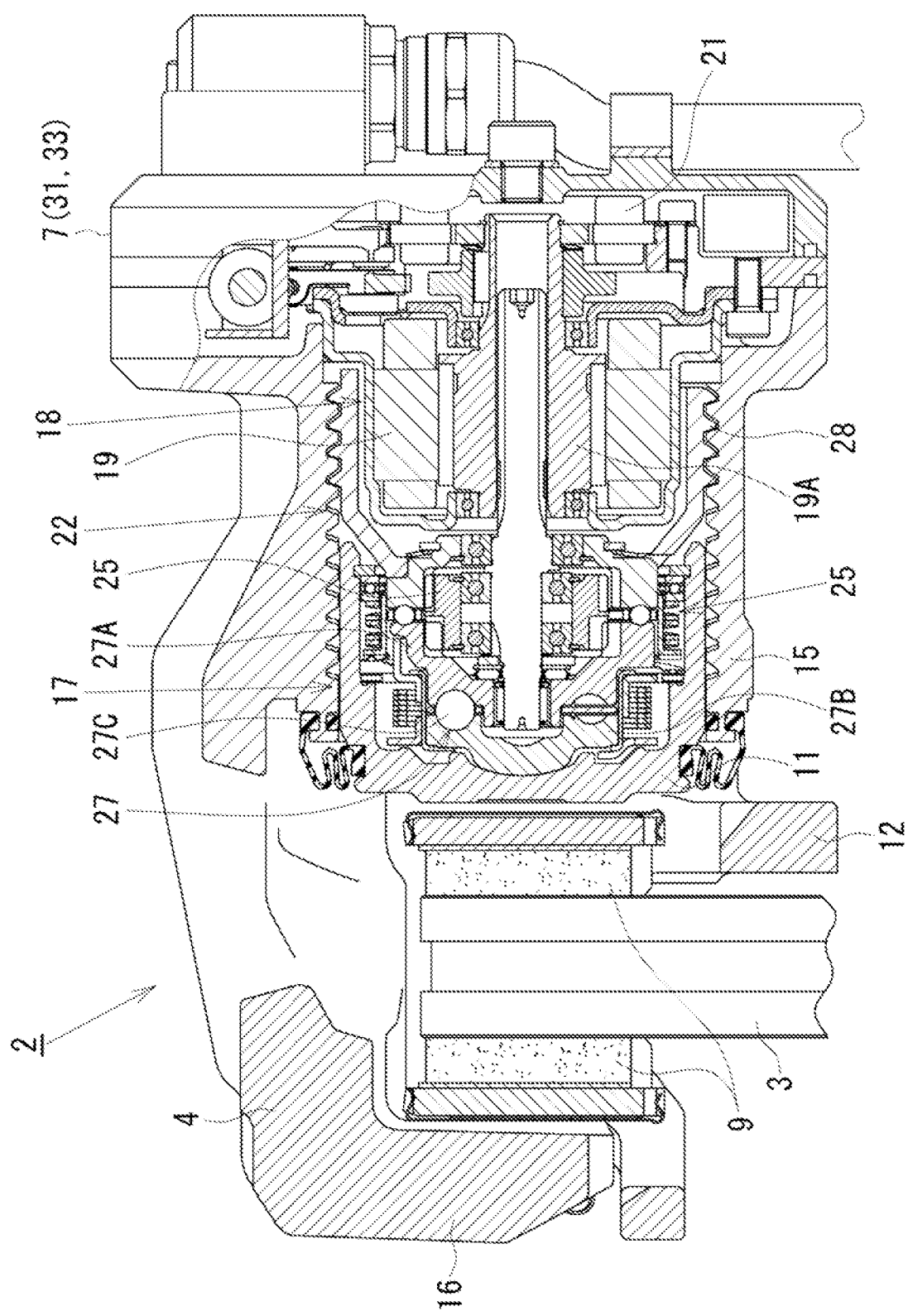
FIG. 2 is a vertical cross-sectional view illustrating an electric caliper of an electric brake apparatus according to the first embodiment.

The configuration of the electric caliper 2 will be described mainly with reference to FIG. 2. As illustrated in FIG. 2, the electric caliper 2 (caliper) is a caliper-floating type disk brake, and includes a disk rotor 3 rotatable together with the wheel, a carrier 12 fixed to a non-rotatable portion (not illustrated) of the vehicle body side such as a suspension member, a pair of brake pads 9 disposed on the both sides of the disk rotor 3 and supported by the carrier 12, and a caliper main body 4 disposed so as to extend over the disk rotor 3 and supported so as to be movable relative to the carrier 12 along the axial direction of the disk rotor 3.

The caliper main body 4 integrally includes a cylindrical cylinder portion 15 including a through-hole which opens to face one side of the disk rotor 3, and a claw portion 16 extending from the cylinder portion 15 to the opposite side over the disk rotor 3. A piston unit 17 and a motor unit 18 are disposed in the cylinder portion 15 of the caliper main body 4.

The piston unit 17 is an integrally assembled one unit constituted by a bottomed cylindrical piston 11 (pressing member) slidably fitted in the cylinder portion 15, a ball and ramp mechanism 27 (rotation-linear motion conversion mechanism) and a differential speed reduction mechanism 25 contained in the piston 11, and a pad wear compensation mechanism 22. The ball and ramp mechanism 27 includes balls 27C (steel balls) disposed in inclined grooves between a rotational disk 27A and a linear motion disk 27B. The ball and ramp mechanism 27 is configured in such a manner that a relative rotation between the rotational disk 27A and the linear motion disk 27B causes rolling motions of the balls 27 in the inclined grooves, thereby axially moving the linear motion disk 27B relative to the rotation disk 27A according to the rotational angle. In this way, the ball and ramp mechanism 27 can convert a rotational motion to a linear motion. In the present embodiment, the rotation-linear motion mechanism is embodied by the ball and ramp mechanism 27, but the rotation-linear motion mechanism may be embodied by, for example, a ball and screw mechanism, a roller and ramp mechanism, or a precision roller screw mechanism.

The differential speed reduction mechanism 25 is disposed between the ball and ramp mechanism 27 and an electric motor 19 of the motor unit 18, and functions to transmit a rotation of a rotor 19A of the electric motor 19 to the rotational disk 27A of the ball and ramp mechanism 27 while slowing down the rotation at a predetermined speed reduction ratio. The pad wear compensation mechanism 22 functions to compensate for wear of the brake pad 9 (a change in the contact position of the brake pad 9 to the disk rotor 3) by moving an adjustment screw 28 to adjust the position of the ball and ramp mechanism 27 according to the wear state of the brake pad 9.

The motor unit 18 includes the electric motor 19, and a positional sensor 21 which serves as a rotational position detection unit, such as a resolver. The positional sensor 21 detects the rotational position of the rotor 19A of the electric motor 19, and outputs detected data to a position control unit 39, an electric current correction unit 43, and an electric current/thrust force conversion function correction unit 47 disposed in the controller 7, which will be described later. Further, the motor unit 18 includes an electric current sensor (refer to FIG. 1). The electric current sensor 23 is an electric current detection unit configured to detect electric current actually flowing through the electric motor 19 to output the detected data to an electric current control unit 41 and an electric current correction unit 43 disposed in the controller 7, which will be described later.

The thus-configured electric caliper 2 functions as follows. Power application to a coil of a stator 30 of the electric motor 19 causes a rotation of the rotor 19A. The rotation of the rotor 19A is slowed down by the differential speed reduction mechanism 25 at the predetermined speed reduction ratio, and then is converted into a linear motion by the ball and ramp mechanism 27, thereby moving forward the piston 11. The forward movement of the piston 11 leads to pressing of one of the brake pads 9 against the disk rotor 3. The reactive force therefrom moves the caliper main body 4 to cause the claw portion 16 to press the other brake pad 9 against the disk rotor 3, thereby generating a brake force. When the brake pad 9 has worn, the adjustment screw 28 of the pad wear compensation mechanism 22 is moved forward to adjust the position of the ball and ramp mechanism 27 according to the wear, thereby compensating for the wear.

Next, the controller 7 will be described. As illustrated in FIG. 1, the controller 7 includes a RAM 31 (storage unit) and an ECU 33. The ECU 33 receives an input of pedal operation information from the operation sensor 6A, and controls actuation of the electric motor 19 based on the pedal operation data indicated by the pedal operation information, thereby controlling the pressing force of the piston 11 applied to the brake pad 9.

Figure 3:
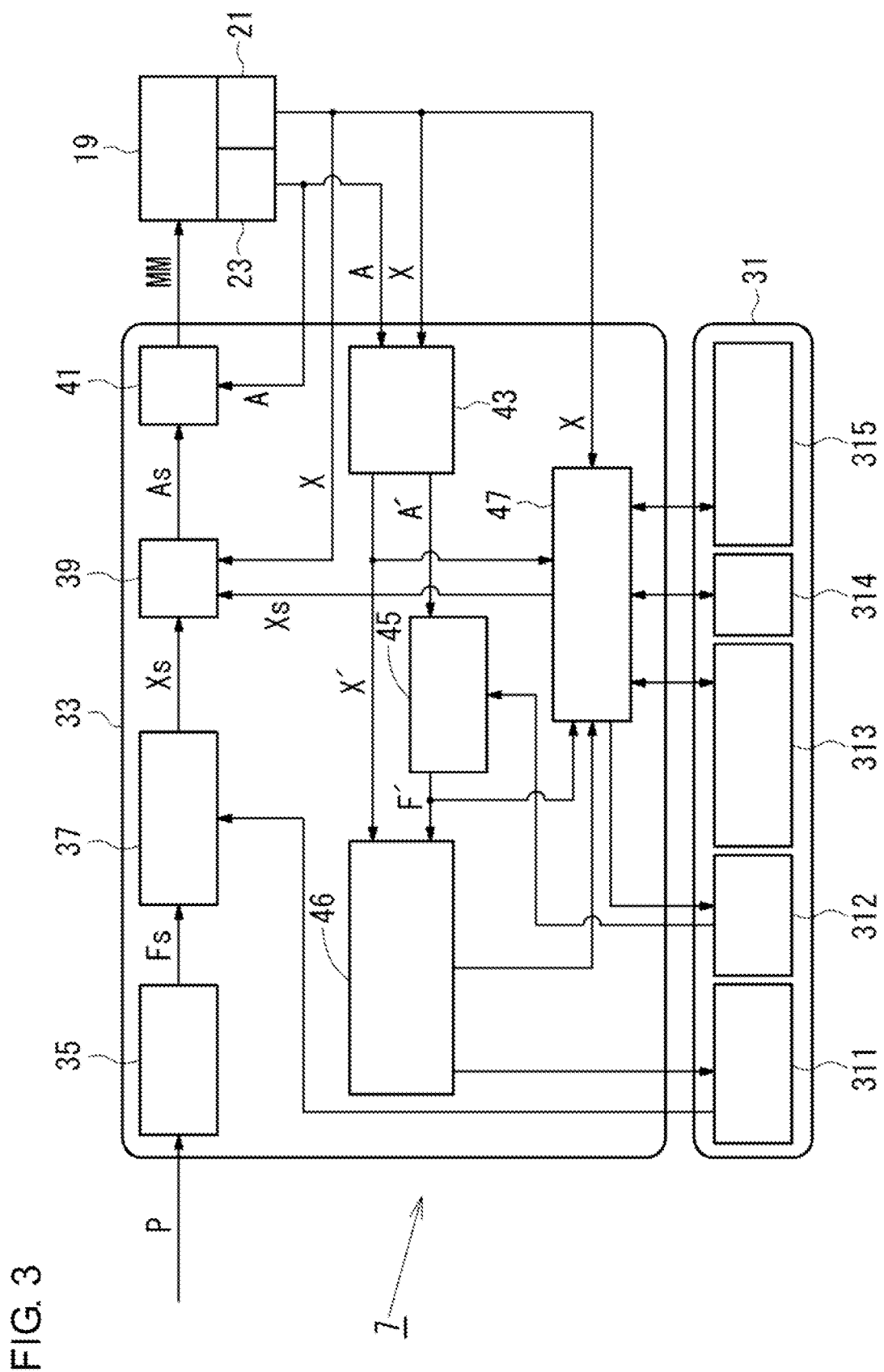
FIG. 3 is a block diagram schematically illustrating a controller of the electric brake apparatus illustrated in FIG. 1.

FIG. 3 is a block diagram schematically illustrating the configuration of the controller. The RAM 31 includes a rotational position/thrust force table 311, an electric current/thrust force conversion function 312, a rotational position/reference thrust force characteristic 313 according to a pad thickness, a pad thickness 314 of the brake pad 9, and a rotational position/thrust force characteristic 315 when the pad has worn entirely. In the present embodiment, the electric current/thrust force conversion function 312 is stored as a linear function, but may be stored as another type of function or a table. The rotational position/thrust force table 311, the rotational position/reference thrust force characteristic 313 according to the pad thickness, and the rotational position/ thrust force characteristic 315 when the pad has worn entirely, which are respectively stored in the RAM 31, are related to the stiffness characteristic of the electric caliper 2, which indicates the relationship between the rotational position of the electric motor 19 and the thrust force.

The ECU 33 includes a pedal operation amount/thrust force instruction conversion unit 35, a thrust force instruction/motor rotational position instruction conversion unit 37, the position control unit 39, the electric current control unit 41, the electric current correction unit 43, a corrected electric current/estimated thrust force conversion unit 45 (thrust force estimation unit), a rotational position/thrust force table generation unit 46, and the electric current/thrust force conversion function correction unit 47 (electric current/thrust force conversion function update unit).

The pedal operation amount/thrust force instruction conversion unit 35 converts input pedal operation amount P (operation information) into a thrust force instruction Fs, and outputs the converted thrust force instruction Fs to the thrust force instruction/motor rotational position instruction conversion unit 37. The thrust force instruction/motor rotational position instruction conversion unit 37 converts the input thrust force instruction Fs into a motor rotational position instruction Xs based on the rotational position/thrust force table 311 stored in the RAM 31, and outputs the converted motor rotational position instruction Xs to the position control unit 39. The position control unit 39 calculates an electric current instruction As based on the deviation of a rotational position X of the electric motor 19 that is detected by the position sensor 21 from the motor rotational position instruction Xs input from the thrust force instruction/motor rotational position instruction conversion unit 37, and outputs the calculated electric current instruction As to the electric current control unit 41. The position control unit 39 can calculate the electric current instruction As with use of, for example, PID control or an observer. The electric current control unit 41 calculates a motor operation instruction MM such as a PWM signal corresponding to the electric current instruction As, and outputs the calculated motor operation instruction MM to the electric motor 19.

The electric motor 19 receives the motor operation instruction MM corresponding to the electric current instruction As from the electric current control unit 41, and starts rotating according to the motor operation instruction MM (corresponding to the electric current instruction As), by which the electric caliper 2 is actuated. At this time, the rotational position X of the electric motor 19 is detected by the position sensor 21, and the value A of electric current actually flowing through the electric motor 19 (for example, a q-axis electric current value of a permanent magnet synchronous motor) is detected by the electric current sensor 23. The detected data is input into the electric current correction unit 43 of the ECU 33.

The electric current correction unit 43 of the ECU 33 calculates a corrected electric current A' purely contributive to thrust force generation by performing electric current correction processing of filtering electric current to subtract coulomb friction, viscous friction, an acceleration torque, a torque ripple inherent to the electric motor 19, a disturbance in synchronization with an electric angle, a disturbance in synchronization with a mechanical angle, and other disturbances, based on the electric current A detected by the electric sensor 23 and the rotational position X (including the rotational speed and rotational acceleration calculated by differentiating the rotational position; also referred to as "rotational position information") of the electric motor 19 detected by the positional sensor 21, using a predetermined calculation formula or formulae, or a predetermined map or maps. More specifically, the electric current correction unit 43 calculates corrected electric current A' as an electric current value required only to generate a piston thrust force by removing electric current components influential to a change in electric current, such as an acceleration torque, mechanical friction, and viscous resistance at the mechanical portions of the electric caliper 2 such as the ball and ramp mechanism 27, the speed reduction mechanism 25, and the pad wear compensation mechanism 22.

At this time, since the calculated corrected electric current A' involves a time delay due to the influence of filtering processing such as averaging processing (the processing for averaging electric current values within a predetermined motor rotational position range), the electric current correction unit 43 synchronizes the rotational position information X received from the position sensor 21 with the corrected electric current A', outputs the corrected electric current A' to the corrected electric current/estimated thrust force conversion unit 45, and outputs the corrected rotational position X' of the electric motor 19 synchronized with the electric current A' to the rotational position/estimated thrust force table generation unit 46.

The corrected electric current/estimated thrust force conversion unit 45 in the ECU 33 calculates an estimated thrust force F' based on the corrected electric current A' output from the electric current correction unit 43 with use of the electric current/thrust force conversion function 312 defining the relationship between the corrected electric current and the estimated thrust force, which is stored in the RAM 31. Then, the corrected electric current/estimated thrust force conversion unit 45 outputs the calculated estimated thrust force F' to the rotational position/estimated thrust force table generation unit 46.

The rotational position/thrust force table generation unit 46 generates a rotational position/estimated thrust force table indicating the relationship between the motor rotational position and the thrust force with use of the estimated thrust force F' calculated by the corrected electric current/estimated thrust force conversion unit 45, and the corrected rotational position X' from the electric current correction unit 43, and overwrites and updates the rotational position/thrust force table 311 stored in the RAM 31. The rotational position/thrust force table generation unit 46 generates the rotational position/thrust force table at the time of completion of one brake operation from pressing of the brake pedal 5 to a release of the operation applied to the brake pedal 5 after a desired brake force is generated, with use of a plurality of estimated thrust forces F' calculated by the corrected electric current/estimated thrust force conversion unit 45 during the one brake operation, and corrected rotational positions X' corresponding thereto. Further, updating the rotational position/thrust force table 311 is also performed by the rotational position/thrust force table generation unit 46 at the time of completion of one brake operation. In this way, updating the rotational position/thrust force table 311 each time one brake operation is completed makes it possible to perform highly accurate brake force control reflecting changes in the stiffness characteristics of the caliper main body 4 and the brake pad 9.

The electric current/thrust force conversion function correction unit 47 inputs a pad thickness 314 of the brake pad 9 stored in the RAM 31, and the rotational position/estimated thrust force table generated by the rotational position/thrust force table generation unit 46. Further, the electric current/thrust force conversion function correction unit 47 selects and inputs the rotational position/reference thrust force characteristic 313 corresponding to the input pad thickness 314.

Then, electric current/thrust force conversion function correction unit 47 compares the rotational position/estimated thrust force table generated by the rotational position/estimated thrust force table generation unit 46 with the selected rotational position/reference thrust force characteristic to correct and update the electric current/thrust force conversion function 312 to store it into the RAM 31. In the present embodiment, the electric current/thrust force conversion function correction unit 47 corresponds to an electric current/thrust force conversion function update unit.

Next, the operation of the electric brake apparatus 1 will be described. Referring to FIGS. 2 and 3, when a driver operates the brake pedal 5, a pedal operation amount, which is a brake instruction signal from the operation sensor 6A of the stroke simulator 6, is input into the ECU 33 of the controller 7. In the ECU 33, the pedal operation amount is converted into a target thrust force, with which the piston 11 should press the brake pad 9, by the pedal operation amount/thrust force instruction conversion unit 35, and then is input into the thrust force instruction/rotational position instruction conversion unit 37 as a thrust force instruction value Fs. The thrust force instruction/rotational position instruction conversion unit 37 determines a rotational position Xs of the electric motor 19 corresponding to the thrust force instruction value Fs with use of the rotational position/thrust force table 311 stored in the RAM 31, and transmits the determined rotational position Xs to the position control unit 39 as a rotational position instruction.

The position control unit 39 determines an electric current instruction As to be output to the electric motor 19 based on a deviation of the rotational position X of the electric motor 19 detected by the position sensor 21 from the rotational position instruction Xs, and transmits the determined electric current instruction to the electric current control unit 41. The electric current instruction As can be determined with use of, for example, PID control or an observer. The electric current control unit 41 calculates a motor operation instruction MM (in the form of, for example, a PWM signal) corresponding to the electric current instruction As, and supplies electric current to the electric motor 19 through the motor operation instruction MM according to the electric current instruction As. This results in thrust force control through an adjustment of the rotational position, and the electric motor 19 is rotated to reach a rotational position according to the target thrust force. Then, the rotation of the electric motor 19 causes the piston 11 to move forward through the speed reduction mechanism 25 and the ball and ramp mechanism 27, which are transmission mechanisms, and to then press the brake pad 9 against the disk rotor 3, thereby generating a brake force.

During the above-described brake operation, the rotational position X of the electric motor 19 detected by the position sensor 21, and the electric current A detected by the electric current sensor 23 are input into the electric current correction unit 43. The electric current correction unit 43 performs filtering processing based on the electric current information and the rotational position information to extract only components contributive to generation of a thrust force to thereby generate a corrected electric current A', and transmits the generated corrected electric current A' to the corrected electric current/estimated thrust force conversion unit 45. Further, the electric current correction unit 43 transmits a corrected rotational position X' synchronized with the corrected electric current A' to the rotational position/estimated thrust force table generation unit 46. The corrected electric current A' and the corrected rotational position X' are output in each control cycle of the movement averaging processing, and are transmitted to the corrected electric current/estimated thrust force conversion unit 45 and the rotational position/estimated thrust force table generation unit 46, respectively.

The corrected electric current/estimated thrust force conversion unit 45 calculates an estimated thrust force F' based on the corrected electric current A' with use of the electric current/thrust force conversion function 312 stored in the RAM 31, and transmits the calculated estimated thrust force to the rotational position/estimated thrust force table generation unit 46. According to conventional electric brake apparatuses, this electric current/thrust force conversion function continues being used without being updated from an initial function or a table set at the time of the manufacturing. However, keeping using a fixed electric current/thrust force conversion function in this way may result in an eventual loss of accuracy of an estimated value of thrust force due to a change in the mechanical portions of the caliper over time, thereby leading to a possibility of being deprived of an ability to maintain highly accurate control of the electric brake apparatus. Further, when such a state occurs at both the left and right wheel sides, this may reduce the vehicle stability at the time of a brake operation. According to the present embodiment, this problem can be solved by causing the electric current/thrust force conversion function correction unit 47, which will be described later in detail, to appropriately update the electric current/thrust force conversion function 312.

The rotational position/estimated thrust force table generation unit 46 generates a rotational position/estimated thrust force table indicating the relationship between the corrected rotational position X' and the estimated thrust force F' based on the corrected rotational position data and the estimated thrust force data accumulated in brake operations to output the generated rotational position/estimated thrust force table to the electric current/thrust force conversion function correction unit 47, and also overwrites and updates the rotational position/thrust force table 311 stored in the RAM 31. In this way, it is possible to maintain highly accurate control, despite wear of the brake pad 9, other changes over time, and influences of disturbances, by updating the rotational position/thrust force table 311 with use of the estimated thrust force F' calculated based on electric current A actually flowing in the electric motor 19, which is detected by the electric current sensor 21.

In the electric brake apparatus 1, the electric current/thrust force conversion function correction unit 47 appropriately updates the electric current/thrust force conversion function 312 for use in a calculation of an estimated thrust force. As a result, despite wear of the brake pad 9, changes at the mechanical portions of the electric caliper over time, and influences of disturbances, the corrected electric current/estimated thrust force conversion unit 45 can keep accurately calculating an estimated thrust force F', thereby maintaining high accuracy of control of the electric brake apparatus to acquire a stabilized brake force.

The above-described electric current/thrust force conversion function correction unit 47 inputs the pad thickness 314 of the brake pad 9 stored in the RAM 31 and the latest rotational position/estimated thrust force table 311 generated by the rotational position/estimated thrust force table generation unit 46, and selects the rotational position/reference thrust force characteristic 313 according to the pad thickness 314 in the RAM 31. Then, the electric current/thrust force conversion function correction unit 47 compares the rotational position/estimated thrust force table 311 generated by the rotational position/estimated thrust force table generation unit 46 with the selected rotational position/reference thrust force characteristic 313 to correct and update the electric current/thrust force conversion function 312. At this time, the electric current/thrust force conversion function correction unit 47 corrects and updates the electric current/thrust force conversion function 312 in such a manner that an estimated thrust force F' corresponding to a predetermined rotational position of the electric motor 19 falls within a predetermined range relative to the reference thrust force based on the pad thickness 314 and the rotational position/reference thrust force characteristic 313 according to the pad thickness.

In the electric current/thrust force conversion function correction unit 47, it is possible to determine whether the brake pad 9 has been exchanged by comparing the calculated latest pad thickness with the pad thickness 314 at the time of execution of the previous processing, which is stored in the storage unit 314 of the RAM 31. Further, the rotational position/reference thrust force characteristic 313 according to the pad thickness is selected according to the pad thickness 314 stored in the RAM 31.

Figure 4:
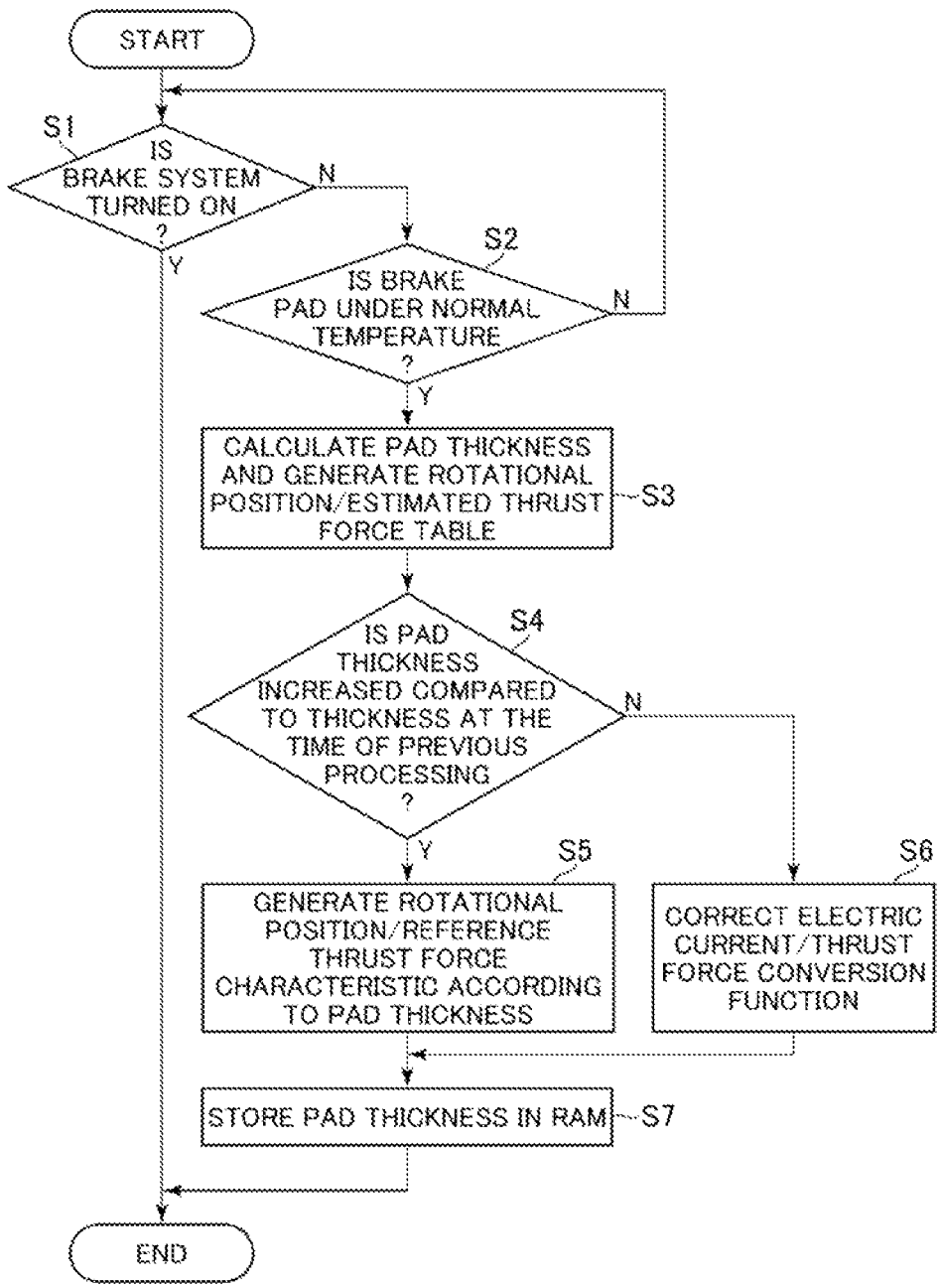
FIG. 4 is a flowchart illustrating electric current/thrust force conversion function update processing that an ECU illustrated in FIG. 3 performs.

FIG. 4 is a flowchart illustrating processing of updating the rotational position/thrust force table 311 and the electric current/thrust force conversion function 312 stored in the RAM 31. Referring to FIG. 4, in step S1, it is determined whether the brake system of the electric brake apparatus 1 is now in operation (ON), i.e., whether brake control is being performed. If it is determined in step S1 that the brake system is in operation (ON), the present processing of updating the electric current/thrust force conversion function is ended.

On the other hand, if it is determined in step S1 that the brake system is not in operation (ON), the processing proceeds to step S2, in which it is determined whether the brake pad 9 is under a normal temperature or an ambient temperature. If it is determined in step S2 that the brake pad 9 is not under the normal temperature, the processing returns to step S1. If it is determined in step S2 that the brake pad 9 is under the normal temperature, the processing proceeds to step S3.

The update processing is performed only when the brake pad 9 is under the normal temperature, because the temperature can be a cause of a reduction in the mechanical efficiency of the mechanical parts and demagnetization of the magnet in the electric motor 19, which lead to a change in the caliper 4 over time. Therefore, the processing of updating the electric current/thrust force conversion function is performed under the normal temperature every time so that the influence of the temperature can be eliminated and the presence or absence of a change over time can be confirmed. The determination processing in step S2 may be performed by, for example, estimating that the brake pad is under a normal temperature when the condition that the vehicle is parked and a predetermine time has passed since the engine is turned off is satisfied, and estimating that the brake pad is not under a normal temperature when the condition is satisfied. Alternatively, the determination processing in step S2 may be realized by the provision of a temperature sensor.

In step S3, the thickness of the brake pad 9 (pad thickness 314) is calculated based on the point where the brake pad 9 contacts the disk rotor 3 as the piston 11 advances. Further, the rotational position/thrust force table generation unit 46 generates update information of the rotational position/thrust force table 311. Then, the processing proceeds to step S4.

In step S4, the latest pad thickness do calculated in step S3 is compared with the pad thickness 314 calculated in the previous control cycle, which is stored in the RAM 31 to determine whether the pad thickness is increased compared to the thickness in the previous control cycle. If the pad thickness is increased (Y), it is determined that the brake pad 9 has been exchanged, and then processing proceeds to step S5. If the pad thickness is not increased (N), the processing proceeds to step S6. In the present embodiment, it is determined whether the brake pad 9 has been exchanged according to an increase or reduction in the calculated pad thickness. However, it may be determined by another method whether the brake pad 9 has been exchanged.

In step S5, the electric current/thrust force conversion function correction unit 47 generates the rotational position/reference thrust force characteristic 313 according to the pad thickness of the brake pad 9 after the exchange, and stores the generated characteristic 313 in the RAM 31. Then, the processing proceeds to step S7. In the present embodiment, the rotational position/reference thrust force characteristic 313 according to the pad thickness is generated each time the pad has been exchanged to eliminate the influence of a variation in the characteristics and types of pads at the time of a pad exchange, with use of the rotational position/thrust force characteristic 315 when the pad has worn entirely, which is stored in the RAM 31 in advance, the pad thickness (the latest pad thickness dn) calculated in step S3, and the generated rotational position/estimated thrust force table 311.

In step S6, the rotational position/reference thrust force characteristic 313 corresponding to the pad thickness at that time is determined based on the pad thickness determined in step S3, and the rotational position/reference thrust force characteristic 313 according to the pad thickness after the brake pad 9 is exchanged, which is generated in step 5. The electric current/thrust force conversion function 312 is corrected by comparing the determined characteristic 313 with the rotational position/estimated thrust force table 311 generated in step S3. Then, the processing proceeds to step S7. In the present embodiment, the electric current/thrust force conversion function 312 is a linear function, but may be a function or a table of, for example, a rotational position instead of being a linear function.

In step S7, the pad thickness do calculated in step S3 is stored as the pad thickness 314 into the RAM 31. This value will be referred to at the next execution of the present processing, and is used as the previous value of the pad thickness in step S3. Step 7 is ended, with which the processing of correcting and updating the electric current/thrust force conversion function 312 is ended.

Next, the processing of calculating the pad thickness 314 and generating the rotational position/estimated thrust force table in step S3 will be described with reference to FIG. 5, which is a flowchart illustrating a sub routine of step S3, and FIG. 6, which is a timing chart illustrating changes in the rotational position and the estimated thrust force over time.

Figure 5:
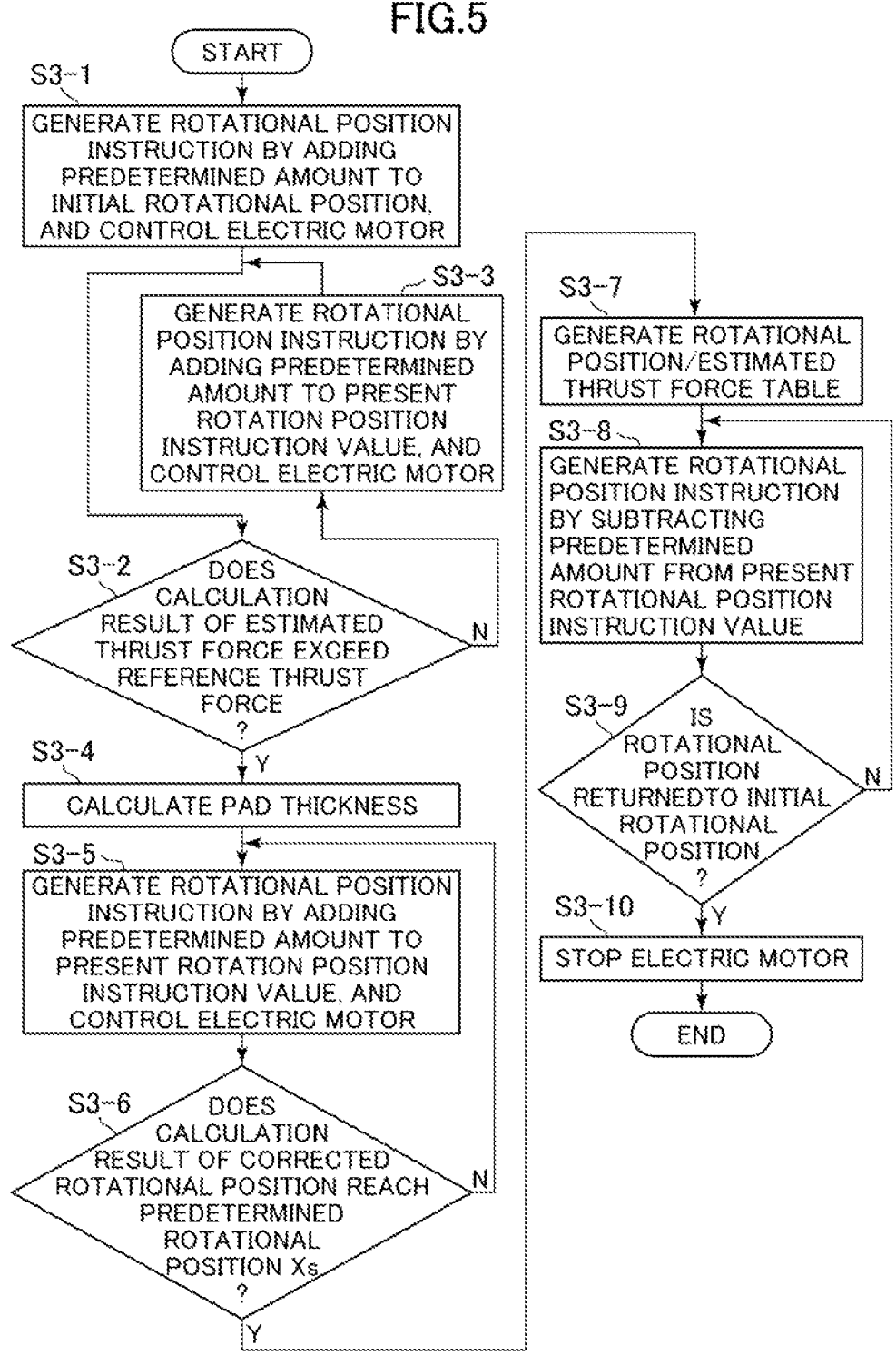
FIG. 5 is a flowchart illustrating pad thickness calculation and rotational position/estimated thrust force table generation processing, which corresponds to a sub routine of step S3 illustrated in FIG. 4.

Referring to FIG. 5, in step S3-1, the electric current/thrust force conversion function correction unit 47 issues a rotational position instruction Xs for moving forward the piston 11 at a predetermined rotational speed in the direction causing the brake pad 9 to be pressed against the disk rotor 3, and the electric motor 19 is driven by the position control unit 39 and the electric current control unit 41. More specifically, the electric current/thrust force conversion function correction unit 47 generates a rotational position instruction Xc1 by adding a predetermined amount ΔX to an initial rotational position X0 at the time of a start of the processing in step S3. After that, the processing proceeds to step S3-2. In the present embodiment, the predetermined amount ΔX of the rotational position instruction is, for example, an increase amount of rotational position required for the rotational speed of the electric motor 19 to reach 100 rmp. As a result, referring to FIG. 6, the electric motor 19 starts to rotate at time t0. After that, an estimated thrust force F is calculated at time t1 with a delay derived from the filtering processing of the electric current correction unit 43.

In step S3-2, it is determined whether the estimated thrust force F' calculated by the corrected electric current/estimated thrust force conversion unit 45 as the electric motor 19 is driven exceeds a reference thrust force F0, which is a predetermined thrust force. Whether the brake pad 9 contacts disk rotor 3 is determined by this determination. If it is determined as a result of the determination in step S3-2 that the estimated thrust force F' exceeds the reference thrust force F0, the processing proceeds to step S3-4. If it is determined that the estimated thrust force F' does not exceed the reference thrust force F0, the processing proceeds to step S3-3, in which a rotational position instruction Xcn+1 is generated by further adding the predetermined amount ΔX to the rotational position instruction Xcn at that time. Then, the processing returns to step S3-2. In the present embodiment, the reference thrust force F0 is, for example, 3 kN.

Figure 6:
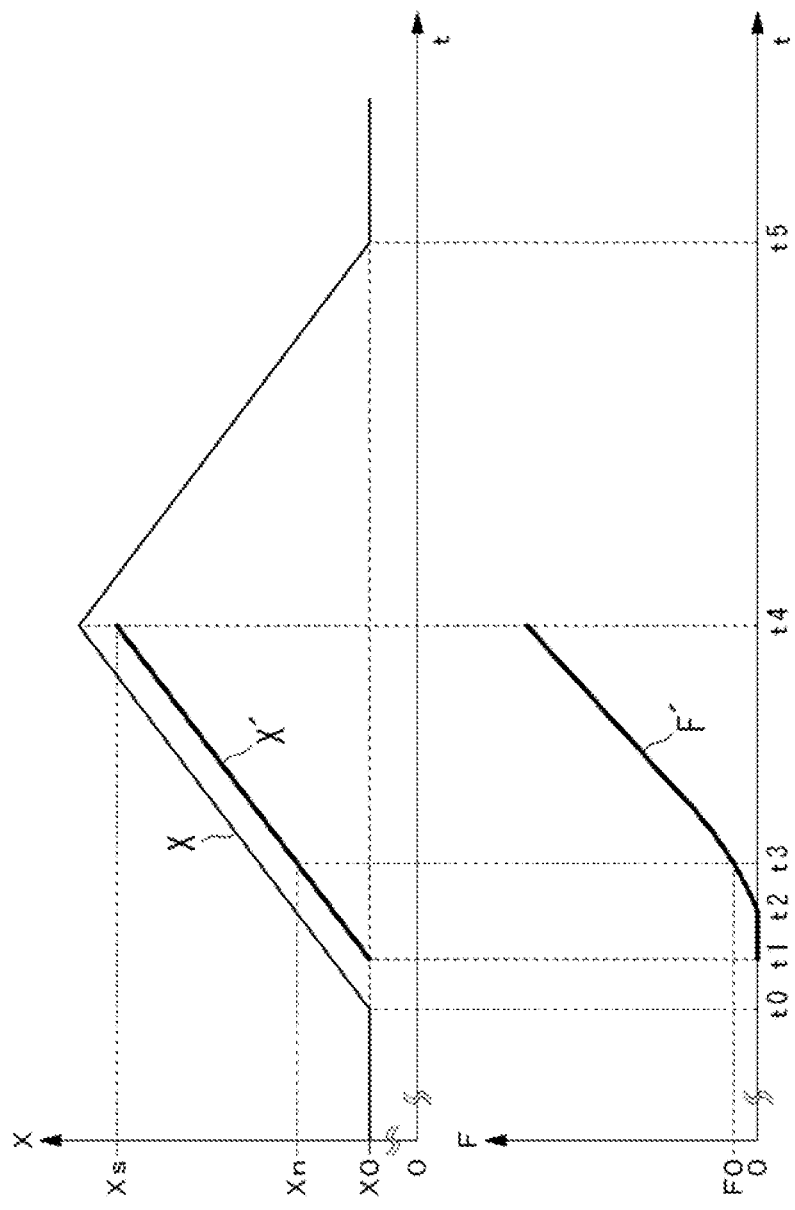
FIG. 6 is a timing chart illustrating changes in the rotational position and the estimated thrust force over time during execution of the processing illustrated in FIG. 5.

Referring to FIG. 6, the estimated thrust force F starts to increase due to the contact of the brake pad 9 to the disk rotor 3 at time t2, and the estimated thrust force F' reaches the predetermined reference thrust force F0 at time t3. The corrected rotational position (the rotational position synchronized with the electric current in consideration of a delay due to the filtering processing) at this time is set as a reference rotational position Xn.

In step S3-4, when the calculated estimated thrust force F' exceeds the reference thrust force F0, the corrected rotational position calculated by the electric current correction unit 43 is set as the reference rotational position Xn, and the pad thickness is calculated by subtracting this reference rotational position Xn from a reference rotational position Xe corresponding to the reference thrust force F0 according to the rotational position/thrust force characteristic 315 when the pad has worn entirely, which is stored in the RAM 31, thereby calculating the pad thickness. Then, the processing proceeds to step S3-5.

In the present embodiment, the pad thickness is calculated with use of the rotational position/thrust force characteristic 315 when the pad has worn entirely, which is stored in the RAM 31 in advance. For this reason, the reference rotational positions Xn and Xe should be detected on the same coordinate system to realize subtraction processing. Therefore, an original point is set based on a mechanically fixed point such as the rear end position of the ball and ramp mechanism 25 or the wear compensation mechanism 22. Accordingly, in a case where the position sensor 21 is embodied by, for example, a position sensor not having an absolute original point such as a resolver, the electric motor 19 is first rotated to a certain mechanical reference point when the electric brake apparatus is started up to set the original point. In a case where the rotational position of the electric motor 19 can be stored even when the power is turned off, or the position sensor 21 is embodied by a sensor having a certain mechanical original point, positions can be detected based on that original point.

Further, in the present embodiment, the reference thrust force F0 is used to detect the reference rotational position Xn where the brake pad 9 contacts the disk rotor 3. This is because uneven wear of the brake pad 9 may lead to a reduction in the apparent stiffness of the brake pad 9 and thereby lead to an increase in the movement amount from the rotational position where the brake pad 9 contacts the disc rotor 3 to the rotational position where the thrust force starts to rise, compared to the brake pad 9 that does not wear. To solve the influence of this uneven wear, the reference thrust force F0 is set as a value reflecting the increase in the movement amount of the rotational position X due to the uneven wear. The pad contact position where the brake pad 9 contacts the disk rotor 3 can be detected just by confirming generation of a certain amount of a thrust force. Therefore, the reference thrust force F0 may be replaced with an electric current value of the electric motor 19, or a change amount of rotational position relative to an electric current value of the electric motor 19. Alternatively, a limit switch such as a micro switch capable of detecting a contact between the brake pad 9 and the disk rotor 3 may be provided, and the rotational position of the electric motor 19 when this switch detects the contact may be set as the reference rotational position Xn, which indicates a pad contact position.

In step S3-4, the pad thickness do is calculated by subtracting the determined reference rotational position Xn from the reference rotational position X0 when the pad has worn entirely. In the present embodiment, a change amount of the pad thickness due to pad wear is calculated as the pad thickness, but the detected reference rotational position may be compared with the reference rotational position when the pad has been just exchanged, i.e., the reference rotational position when the pad is new, and may be calculated as a pad wear amount. Alternatively, the detected reference rotational position may be used as the pad thickness without any special conversion applied thereto.

In step S3-5, the rotational position instruction Xd1 is generated to continuously move forward the piston 11 at a predetermined rotational speed in the direction for pressing the brake pad 9 against the disk rotor 3, by adding a predetermined amount to the present rotational position instruction value. Then the electric motor 19 is driven by the position control unit 39 and the electric current control unit 41. Then, the processing proceeds to step S3-6.

In step S3-6, it is determined whether the corrected rotational position reaches a predetermined rotational position Xs. If it is determined as a result of step S3-6 that the corrected rotational position reaches the predetermined rotational position Xs (Y), the processing proceeds to step S3-7. If it is determined as a result of step S3-6 that the corrected rotational position does not reach the predetermined rotational position Xs (N), the processing returns to step S3-5, in which the electric motor 19 is continuously driven at a predetermined rotational speed. The predetermined rotational position Xs is a position shifted from the reference rotational position Xn by a predetermined amount, for example, by a rotational amount of the electric motor 19 required to move the piston 11 by 0.5 mm. This predetermined rotational position Xs is data for generating the rotational position/estimated thrust force table, and is set according to a thrust force required to be controlled as a position generating a thrust force sufficiently relative to the reference rotational position Xn determined in step S3-4. An electric current value and an estimated thrust force may be used as a parameter, instead of the reference rotational position Xn. Referring to FIG. 6, the corrected rotational position of the electric motor 19 reaches the predetermined rotational position Xs at time t4.

In step S3-7, the rotational position/thrust force table generation unit 46 generates the rotational position/estimated thrust force table 311 with use of the estimated thrust force calculated by the corrected electric current/estimated thrust force conversion unit 45 based on the driving of the electric motor 19 until step S3-6. Then, the processing proceeds to step S3-8.

In step S3-8, the electric current/thrust force conversion function correction unit 47 issues a rotational position instruction Xd2 for moving the brake pad 9 away from the disk rotor 3 at a predetermined rotational speed, and the electric motor 19 is driven by the position control unit 39 and the electric current control unit 41. Then, the processing proceeds to step S3-9.

In step S3-9, it is determined whether the rotational position is returned to the initial rotational position X0. If it is determined as a result of step S3-9 that the rotational position is returned to the initial rotational position X0 (Y), the processing proceeds to step S3-10. If it is determined as a result of step S3-9 that the rotational position is not returned to the initial position X0 (N), the processing returns to step S3-8, in which the electric motor 19 is continuously driven at the predetermined rotational speed.

In step S3-10, the issuance of the rotational position instruction Xd2 is stopped, the control of the electric motor 19 is stopped, and the processing of calculating the pad thickness and generating the rotational position/estimated thrust force table is ended. Returning to the main routine, step S3 is ended, and the processing proceeds to step S4.

Referring to FIG. 6, after the corrected rotational position X' of the electric motor 19 reaches the predetermined rotational position Xs at time t4, the electric motor 19 is rotated in the reverse direction to retract the piston 11. When the rotational position is returned to the initial rotational position X0 at time t5, the electric motor 19 is stopped.

Figure 7:
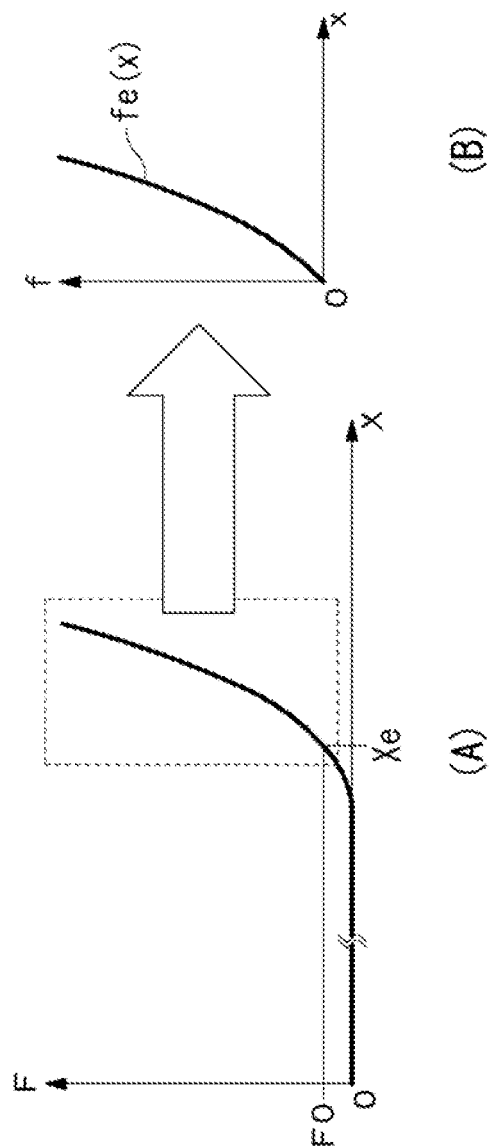
FIG. 7 is a graph illustrating the rotational position/thrust force characteristic when a pad has entirely worn.

Next, the rotational position/the thrust force characteristic 315 when the pad has worn entirely, which is stored in the RAM 31, will be described with reference to FIG. 7. As illustrated in FIG. 7(A), during an actual use, the rotational position/thrust force characteristic when the pad has worn entirely shows such a characteristic that a thrust force is not generated from an original point 0, where the rotational position X is located at a certain mechanical zero point, until the position where the entirely worn brake pad 9 contacts the disk rotor 3. When the brake pad 9 contacts the disk rotor 3, a thrust force is generated. After that, as the rotational position X advances, the thrust force is increased. In this graph, the rotational position X, where generation of the reference thrust force F0 is detected based on the detection value of the electric current sensor 21, is set as the reference rotational point Xe.

Then, as illustrated in FIG. 7(B), the curve representing the rotational position/thrust force characteristic when the pad has worn entirely is shifted so that the reference rotational position Xe and the reference thrust force F0 are located at the original point 0. This function is set as the function fe(x), and the rotational position/thrust force characteristic 315 when the pad has worn entirely is stored in the RAM 31 in advance. The rotational position/thrust force characteristic 315 when the pad has worn entirely may be stored as a table, instead of being stored as a function.

Figure 8:
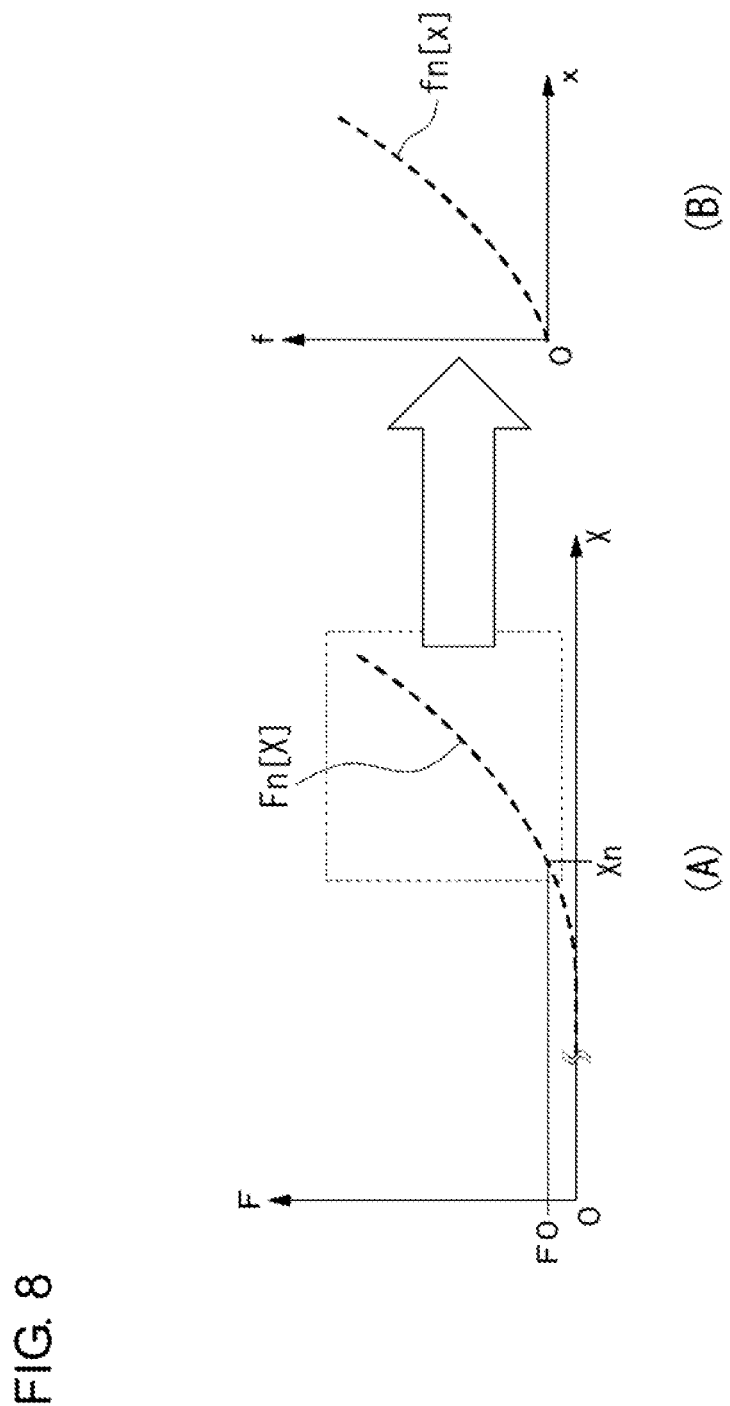
FIG. 8 is a graph for illustrating rotational position/estimated thrust force table generation processing in FIG. 5.

Next, the rotational position/thrust force table 311 stored in the storage unit 311 of the RAM 31 will be described with reference to FIG. 8. As illustrated in FIG. 8(A), a rotational position/thrust force table Fn[X], which is generated based on the estimated thrust force F' calculated by the corrected electric current/estimated thrust force conversion unit 46 and the corrected rotational position X' corrected by the electric current correction unit 43, is shifted so that the reference rotational position Xn and the reference thrust force F0 are located at the original point 0. Then, this is stored in the RAM 31 as the rotational position/thrust force table 311 (fn[x]) illustrated in FIG. 8(B).

Figure 9:
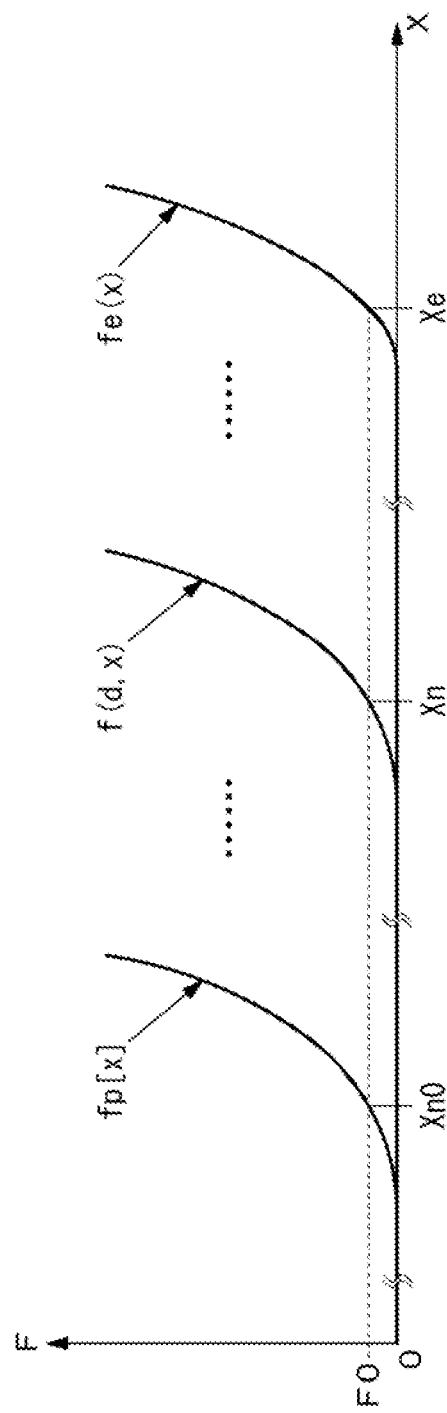
FIG. 9 is a graph illustrating a change in the rotational position/thrust force characteristic according to the pad thickness with a mechanically zero point set as an original point.
Figure 10:
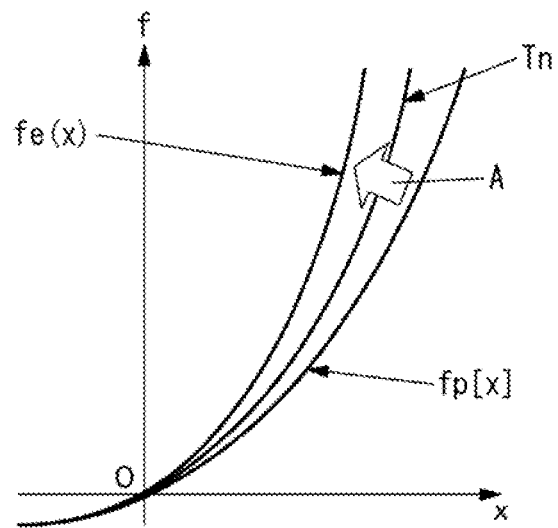
FIG. 10 is a graph illustrating the rotational position/thrust force characteristic according to the pad thickness with reference thrust forces and respective corresponding reference rotational positions according to the rotational position/thrust force characteristic set as the original point.

Next, the rotational position/reference thrust force characteristic 313 according to the pad thickness, which is stored in the RAM 31, will be described with reference to FIGS. 9 to 14. FIG. 9 illustrates a change in the rotational position/thrust force characteristic according to the pad thickness with a predetermined mechanical zero point set as the original point thereof. In this graph, Xn0 indicates a reference rotational position when the pad has been just exchanged, Xn indicates a reference rotational position when the pad has a certain thickness in use, and Xe indicates a reference rotational position when the pad has worn entirely. As the wear of the brake pad 9 progresses, the reference rotational position, where the reference thrust force F0 is generated, is increasing. These curves of the rotational position/thrust force characteristic according to the pad thickness are shifted so that the reference rotational positions Xn0, Xn, and Xe of the respective curves, and the reference thrust force F0 are located at the original point, the result of which is illustrated in FIG. 10. As illustrated in FIG. 10, the rotational position/reference thrust force characteristic shows that the stiffness (the ratio of an increase in the thrust force to an increase in the rotational position) is shifted in the direction indicated by the arrow A depending on the thickness of the brake pad 9, and this means that the stiffness is increasing according to a reduction in the pad thickness.

Figure 11:
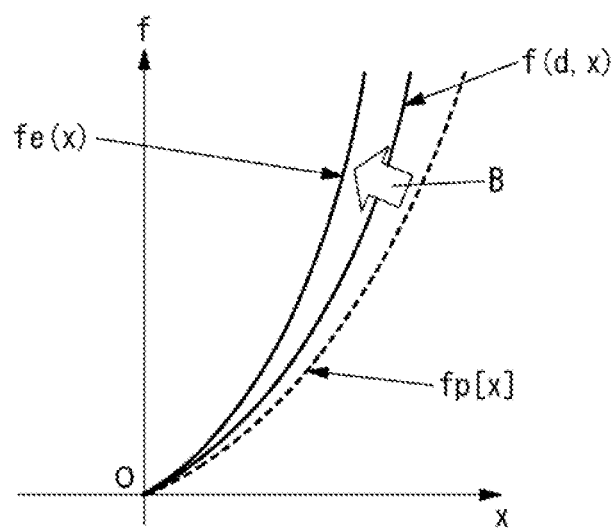
FIG. 11 is a graph illustrating the rotational position/reference thrust force characteristic according to the pad thickness.

The rotational position/reference thrust force characteristic 313 according to the pad thickness can be determined by using a function fe(x) indicating the rotational position/thrust force characteristic 315 when the pad has worn entirely, which is set in advance, and a table fp[x] indicating the rotational position/thrust force characteristic calculated when the pad has been just exchanged (when the pad does not wear at all), and applying interpolation therebetween. Referring to FIG. 11, the rotational position/thrust force characteristic 313 according to pad thickness is expressed by a function f(d, x) in which d represents the pad thickness and x represents the rotational position. The function f(d, x) is generated by applying interpolation between the function fe(x) of the rotational position/thrust force characteristic 315 when the pad has worn entirely and the table fp[x] of the rotational position/thrust force characteristic calculated when the pad has been just exchanged. This function f(d, x) is characterized in that the function f(d, x) when the pad has been just exchanged (when the pad does not wear at all) matches the table fp[x] indicating the rotational position/estimated thrust force characteristic when the pad has been just exchanged, the function f(d, x) is shifted in the direction indicated by the arrow B according to a reduction in the pad thickness, and f(d, x) when the pad has worn entirely matches the function fe(x) indicating the rotational position/thrust force characteristic 315 when the pad has worn entirely.

Here, the function of the pad thickness d expressed by [the function $f(d, x)=\alpha(d)*fe(x)$] is defined as a stiffness coefficient function $\alpha(d)$. This coefficient function $\alpha(d)$ can be determined with use of the pad thickness dp when the pad has been just exchanged and the rotational position/estimated thrust force characteristic table fp[x]. In this case, fp[x] is expressed as $[fp[x]=fe(x)*\alpha(dp)]$. Since $\alpha(dp)=\alpha p$ (constant), $\alpha(d)$ can be determined by calculating $\alpha p$ to obtain the f(d, x) of the rotational position/reference thrust force characteristic 313 according to the pad thickness.

Figure 12:
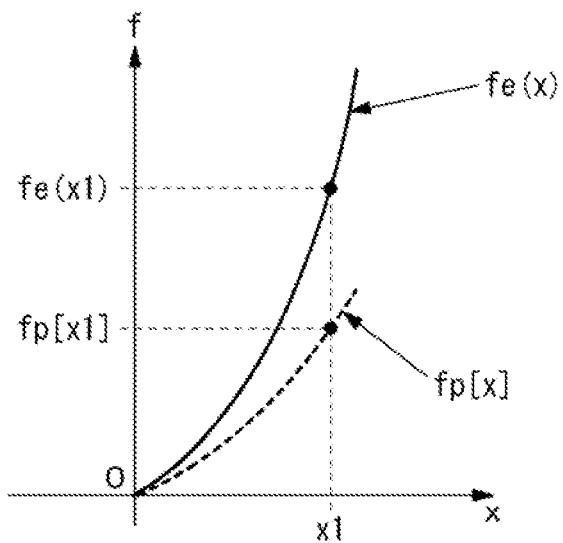
FIG. 12 is a graph illustrating an example of calculating a stiffness coefficient when the pad has been just exchanged.
Figure 13:
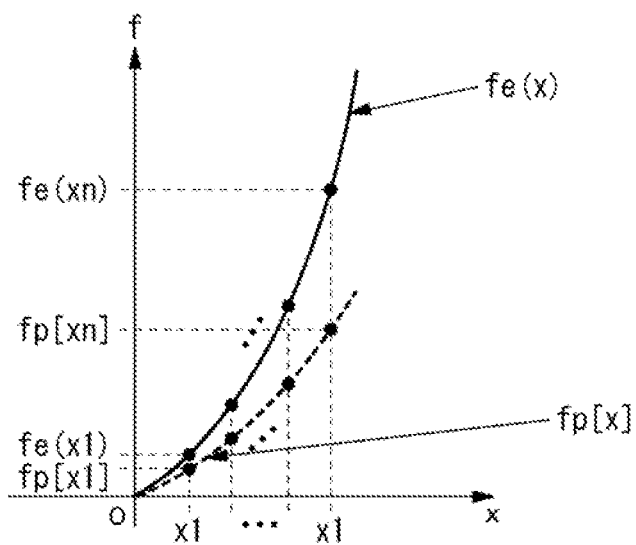
FIG. 13 is graph illustrating an example of calculating the stiffness coefficient when the pad has been just exchanged from a comparison among a plurality of points.

First, $\alpha p$ is calculated with use of the function fe(x) expressing the rotational position/thrust force characteristic 315 when the pad has worn entirely and the rotational position/estimated thrust force table fp[x] when the pad has been just exchanged. At this time, for example, as illustrated in FIG. 12, $\alpha p=fp[x1]/fe(x1)$, which is obtained from $\alpha p*fe(x1)=fp[x1]$, can be calculated for a predetermined rotational position x1, with use of the thrust force fe(x1) when the pad has worn entirely and the thrust force fp[x1] when the pad has been just exchanged. In this case, as illustrated in FIG. 13, $\alpha p$ may be calculated for a plurality of predetermined rotational positions x1, x2, . . . xn.

Figure 14:
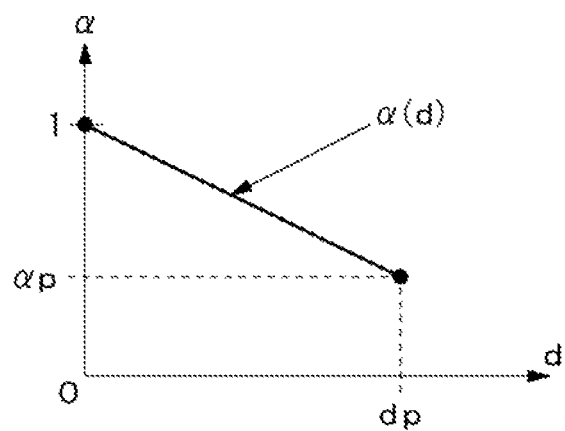
FIG. 14 is a graph illustrating determination of a stiffness coefficient function.

Then, the rotational position/reference thrust force characteristic f(d, x) is determined with use of the pad thickness dp when the pad has been just exchanged and the stiffness coefficient function $\alpha(dp)=\alpha p$. The rotational position/reference thrust force characteristic $f(d, x)$ is such a function that $\alpha(dp)$ is $\alpha p$ when the pad thickness d is dp (when the pad has been just exchanged), and $\alpha(0)$ is 1 when the thickness d is 0 (when the pad has worn entirely). For example, as illustrated in FIG. 14, assuming that the stiffness coefficient function $\alpha(d)$ is a linear function of the pad thickness d, the stiffness coefficient function $\alpha(d)$ is expressed as $\alpha(d)=1+\beta*d$. In this equation, $\beta$ represents the inclination of the linear function (constant), $\beta$ is a negative value, and $\beta=(\alpha p-1)/dp$ can be obtained from the pad thickness dp when the pad has been just exchanged and the stiffness coefficient function $(dp)=\alpha p$.

The stiffness coefficient function $\alpha(d)$ may be a linear function in the above-described manner, or may be another type of function or a table. If the stiffness coefficient function $\alpha(d)$ is embodied by a table, a function for correcting the table may be used when the pad has been just exchanged. Further, in the present embodiment, the stiffness coefficient function $\alpha$ is the function $\alpha(d)$ of the pad thickness d. Alternatively, the stiffness coefficient function a may be a function $\alpha(x)$ of the rotational position x, or may be a function $\alpha(d, x)$ having two valuables. In this case, $\alpha p$ is not a constant but a function $\alpha p(x)$, and the two valuable function $\alpha(d, x)$ may be determined from a difference between a plurality of points as illustrated in FIG. 13.

In this way, the rotational position/reference thrust force characteristic 313 according to the pad thickness of the brake pad 9 is stored in the RAM 31 as the function $f(d, x)$. This rotational position/reference thrust force characteristic 313 according to the pad thickness may be acquired, for example, through an experiment or test, to be stored in the RAM 31 in advance. In this case, steps S4 and S5 in FIG. 4 are omitted, and the processing directly proceeds from step S3 to step S6. Further, the rotational position/reference thrust force characteristic 313 may be stored not only as this function $f(d, x)$ but also as a table.

Figure 15:
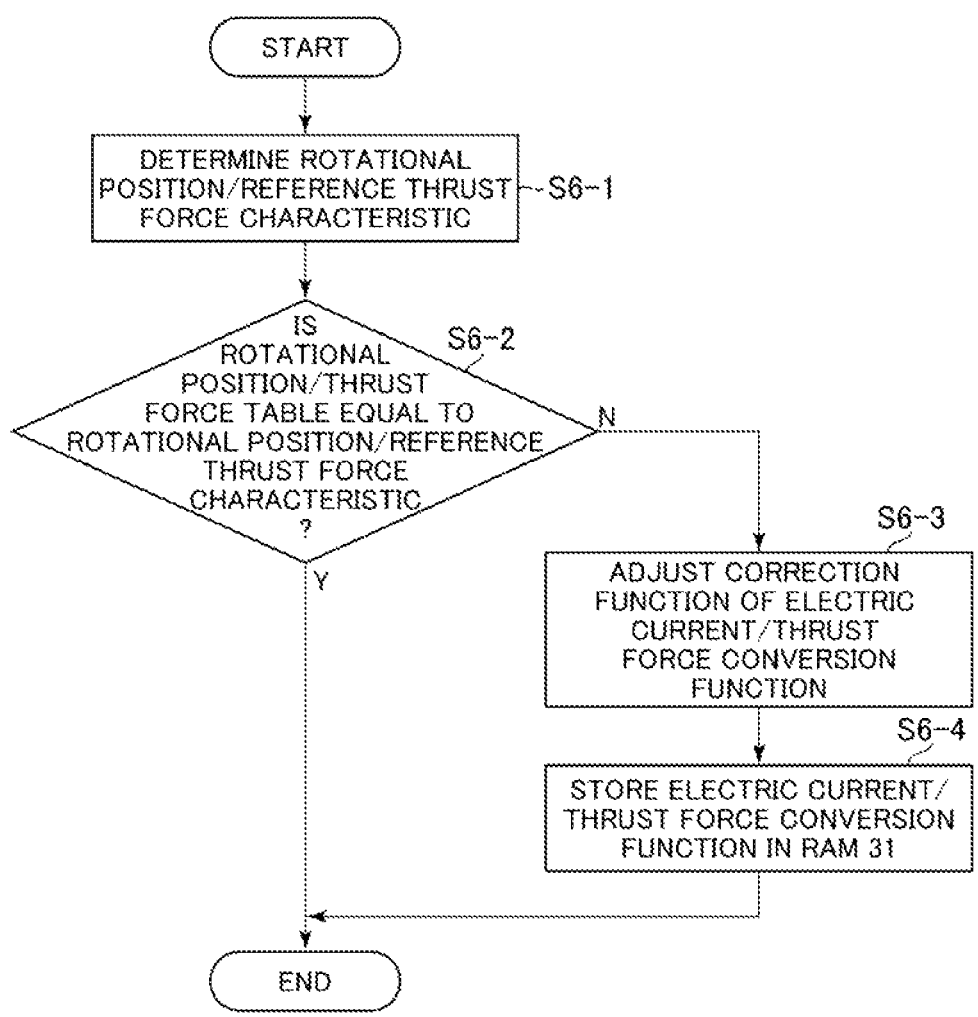
FIG. 15 is a flowchart illustrating the processing of correcting a electric current/thrust force conversion function, which corresponding to a sub routine of step S6 illustrated in FIG. 4.
Figure 16:
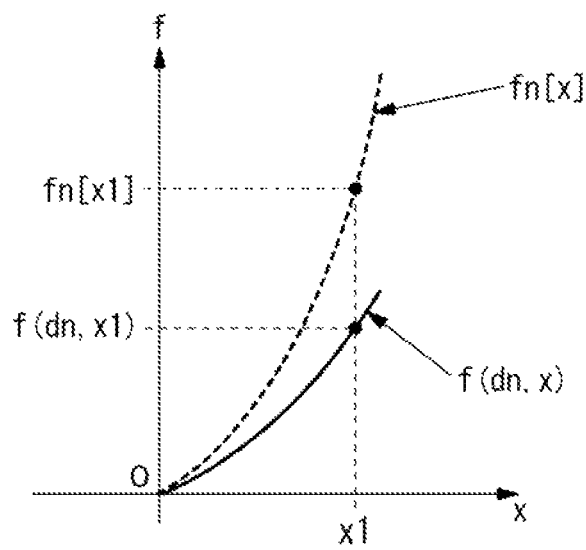
FIG. 16 is a graph illustrating a rotational position/estimated thrust force table and the rotational position/reference thrust force characteristic.

Next, the processing of correcting the electric current/thrust force conversion function 312 stored in the RAM 31 will be described with reference to FIGS. 15 to 17. Referring to FIG. 15, in step S6-1, the function $f(dn, x)$ of the rotational position/reference thrust force characteristic for the pad thickness dn is determined from the pad thickness dn calculated in step S3 in FIG. 4 and the function $f(d, x)$ of the rotational position/reference thrust force characteristic 313 according to the pad thickness obtained in step S5 in FIG. 4. Then, the processing proceeds to step S6-2.

In step S6-2, the function $f(dn, x)$ of the rotational position/reference thrust force characteristic for the pad thickness dn determined in step S6-1 is compared with the rotational position/thrust force table $fn[x]$ generated in step S3, and it is determined whether these are equal to each other or at least their difference is within a predetermined range. For example, as illustrated in FIG. 16, this can be determined by checking whether a difference is within the predetermined range between the function $f(dn, x)$ of the rotational position/reference thrust force characteristic 313 at a predetermined rotational position x1 and the rotational position/thrust force table $fn[x]$. If the difference therebetween is within the predetermined range (Y), it is determined that the electric current/thrust force conversion function 312 does not have to be corrected, and the processing of correcting the electric current/thrust force conversion function 312 is ended. Then, the processing proceeds to step S7 in FIG. 4.

On the other hand, if the difference therebetween is not within the predetermined range (N), it is determined that the electric current/thrust force conversion function 312 should be corrected, and the processing proceeds to step S6-3. In step S6-3, the electric current/thrust force conversion function 312 is corrected with use of a correction function $\gamma$. For example, as illustrated in FIG. 16, $fn[x]=\gamma*f(dn, x)$ can be set, and the correction function $\gamma$ can be calculated from $\gamma=f(dn, x1)/fn[x1]$ with use of the thrust force $fn[x1]$ obtainable from the rotational position/thrust force table $fn[x]$ for the predetermined rotational position and the thrust force $f(dn, x1)$ obtainable from the rotational position/reference thrust force characteristic $f(dn, x)$.

Figure 17:
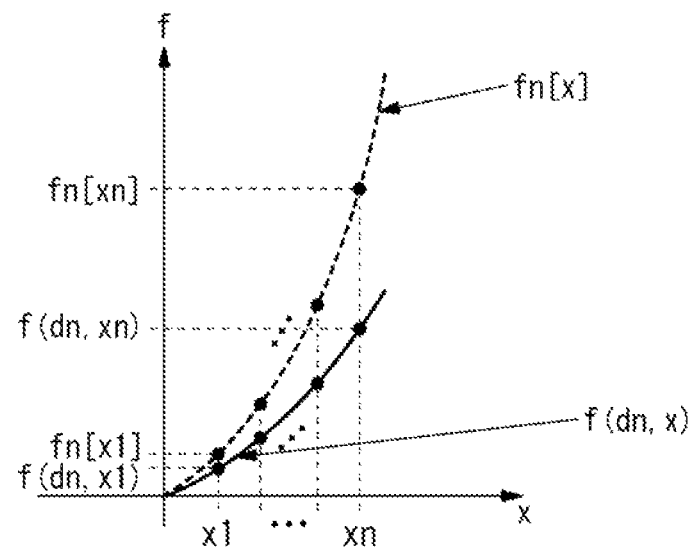
FIG. 17 is a graph illustrating comparison of the rotational position/estimated thrust force table and the rotational position/reference thrust force characteristic at a plurality of points.

As illustrated in FIG. 17, the correction function $\gamma$ may be calculated by comparing $fn[xn]$ and $f(dn, xn)$ with respect to a plurality of predetermined rotational positions x1, x2, ... xn. Alternatively, the correction function $\gamma$ may be set as a table. In this case, the table is generated from the thrust forces corresponding to the plurality of predetermined rotational positions x1, x2, ... xn illustrated in FIG. 17.

After the correction function $\gamma$ is acquired in this way, the processing proceeds to step S6-4, in which the electric current/thrust force conversion function 312 is corrected with use of the correction function $\gamma$, and then is stored in the RAM 31. Then, the processing of updating the electric current/thrust force conversion function 312 is ended. In this way, it is possible to maintain high accuracy of calculating a thrust force to obtain a stabilized brake force despite wear of the brake pad 9 and other changes over time, by appropriately correcting the electric current/thrust force conversion function 312.

Second Embodiment

Next, a second embodiment will be described with reference to FIG. 18. A difference of the present embodiment from the first embodiment is that; in the present embodiment, the controller 7 directly converts a thrust force instruction into an electric current instruction As to control the electric motor 19, instead of converting a thrust force instruction into a rotational position instruction Xs. In the following, like components will be identified by the same reference numerals as those in the first embodiment, and only different features will be described in detail.

Figure 18:
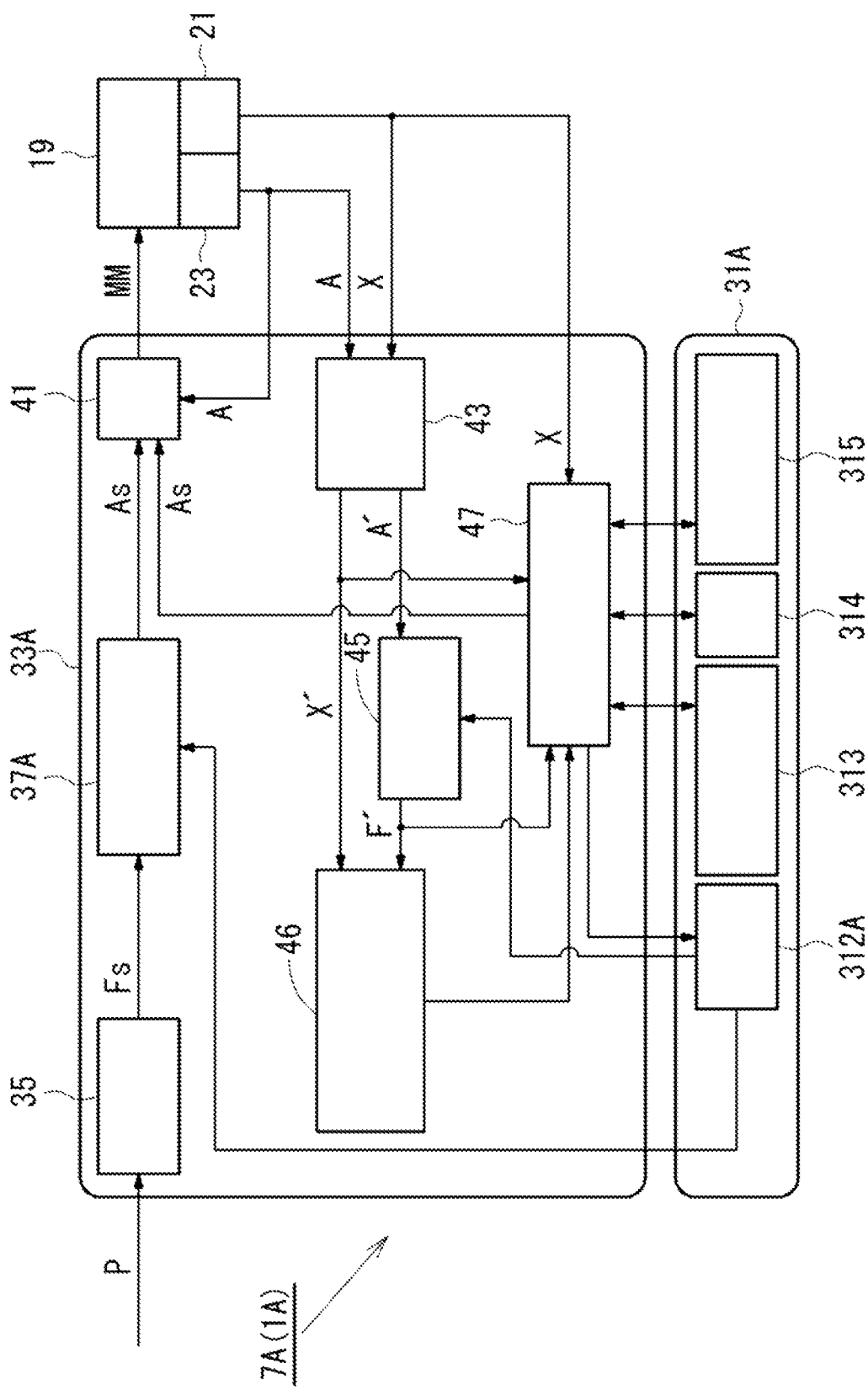
FIG. 18 is a block diagram schematically illustrating a configuration of a controller of an electric brake apparatus according to a second embodiment of the present invention.

In the present embodiment, the controller 7 includes an ECU 33A and a RAM 31A illustrated in FIG. 18. In the ECU 33A, the thrust force instruction Fs issued from the pedal operation amount/thrust force instruction conversion unit 35 is directly converted into the electric current instruction As by a thrust force instruction/electric current instruction conversion unit 37A, and is transmitted to the electric current control unit 41. At this time, the electric current instruction As is determined with use of a thrust force/electric current conversion function (also referred to as an electric current/thrust force conversion function) 312A stored in the RAM 31A. The thrust force/electric current conversion function (electric current/thrust force conversion function) 312A defines the relationship between the electric current flowing through the electric motor 19 and the thrust force of the pressing member 9.

In this case, since the thrust force/electric current conversion function 312A is an inverse function of the electric current/thrust force conversion function 312 in the above-described first embodiment, it is possible to maintain high control accuracy to obtain a stabilized brake force by correcting and updating the thrust force/electric current conversion function 312A despite wear of the brake pad 9 and other changes over time, as is the case with the first embodiment.

According to the above-described exemplary embodiment of the present invention, the electric brake apparatus includes the caliper configured to move the pressing member by the electric motor via the transmission mechanism, to cause the pressing member to press the brake pad against the disk rotor, the control unit configured to control the electric motor based on a thrust force instruction value of the pressing member which is calculated in response to a control instruction signal, the rotational position detection unit configured to detect a rotational position of the electric motor, and the electric current detection unit configured to detect electric current flowing through the electric motor. The control unit comprises the thrust force estimation unit configured to estimate a thrust force of the pressing member from the electric current flowing through the electric motor based on the electric current/thrust force conversion function (312; 312A), which defines the relationship between the electric current flowing through the electric motor and the thrust force of the pressing member, and the electric current/thrust force conversion function update unit configured to correct and update the electric current/thrust force conversion function (312; 312A) by comparing an estimated thrust force at a predetermined rotational position of the electric motor, which is estimated by the thrust force estimation unit, and a reference thrust force corresponding to the predetermined rotational position based on the relationship between the rotational position of the electric motor and the thrust force.

In this way, it is possible to maintain high accuracy of controlling the electric brake apparatus to obtain a stabilized brake force despite wear of the brake pad and a change in the caliper over time, by correcting and updating the electric current/thrust force conversion function without employing a fixed function for the electric current/thrust force conversion function. Further, it is possible to maintain the vehicle stability during a brake operation.

According to the electric brake apparatus of the exemplary embodiment of the present invention, it is possible to maintain predetermined control accuracy despite a change in the caliper and the brake pad over time. Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Application No. 2011-018908 filed on Jan. 31, 2011 including specification, claims, drawings and summary is incorporated herein by reference in its entirety.

What is claimed is:

1. An electric brake apparatus comprising:
a caliper configured to move a pressing member by an electric motor via a transmission mechanism, to cause the pressing member to press a brake pad against a disk rotor;
a control unit configured to control the electric motor based on a thrust force instruction value of the pressing member which is calculated in response to a control instruction signal;
a rotational position detection unit configured to detect a rotational position of the electric motor; and
an electric current detection unit configured to detect an electric current flowing through the electric motor,
the control unit comprising,
a thrust force estimation unit configured to estimate a thrust force of the pressing member from the electric current flowing through the electric motor based on an electric current/thrust force conversion function, which defines a relationship between the electric current flowing through the electric motor and the thrust force of the pressing member, and
an electric current/thrust force conversion function update unit configured to correct and update the electric current/thrust force conversion function by comparing an estimated thrust force corresponding to a predetermined rotational position of the electric motor, which is estimated by the thrust force estimation unit, and a reference thrust force corresponding to the predetermined rotational position of the electric motor based on a relationship between the rotational position of the electric motor and the thrust force of the pressing member.

2. The electric brake apparatus according to claim 1, wherein the predetermined rotational position of the electric motor is set according to wear of the brake pad.

3. The electric brake apparatus according to claim 1, wherein the predetermined rotational position of the electric motor is a rotational position of the electric motor corresponding to a position of the pressing member shifted from a pad contact position toward a disk rotor side by a predetermined amount, based on the pad contact position where the brake pad contacts the disk rotor.

4. The electric brake apparatus according to claim 3, wherein the pad contact position is determined based on the electric current flowing through the electric motor.

5. The electric brake apparatus according to claim 1, wherein the control unit instructs the rotational position of the electric motor according to the thrust force instruction value based on the relationship between the rotational position of the electric motor and the thrust force of the pressing member, and
updates the relationship between the rotational position of the electric motor and the thrust force of the pressing member based on the estimated thrust force corresponding to the predetermined rotational position of the electric motor, which is estimated by the thrust force estimation unit.

6. The electric brake apparatus according to claim 1, wherein the control unit stores the relationship between the rotational position of the electric motor and the thrust force of the pressing member as a table.

7. The electric brake apparatus according to claim 1, wherein:
the electric current is a first electric current,
the control unit supplies a second electric current to the electric motor, and
the second electric current corresponds to the thrust force instruction value based on the electric current/thrust force conversion function updated by the electric current/thrust force conversion function update unit.

8. The electric brake apparatus according to claim 1, wherein the electric current/thrust force conversion function update unit updates the electric current/thrust force conversion function when the caliper is under an ambient temperature.

9. An electric brake apparatus comprising:
a caliper configured to move a pressing member by an electric motor via a transmission mechanism, to cause the pressing member to press a brake pad against a disk rotor;
a control unit configured to control the electric motor based on a thrust force instruction value of the pressing member which is calculated in response to a control instruction signal;
a rotational position detection unit configured to detect a rotational position of the electric motor; and an electric current detection unit configured to detect an electric current flowing through the electric motor, the control unit comprising, a thrust force estimation unit configured to estimate a thrust force of the pressing member from the electric current flowing through the electric motor based on an electric current/thrust force conversion function, which defines a relationship between the electric current flowing through the electric motor and the thrust force of the pressing member, a pad thickness calculation unit configured to calculate a thickness of the brake pad based on the rotational position of the electric motor, and an electric current/thrust force conversion function update unit configured to correct and update the electric current/thrust force conversion function by comparing an estimated thrust force corresponding to a predetermined rotational position of the electric motor, which is estimated by the thrust force estimation unit, and a reference thrust force corresponding to the predetermined rotational position of the electric motor based on a relationship between the rotational position of the electric motor and the thrust force of the pressing member, the relationship between the rotational position of the electric motor and the thrust force of the pressing member being selected according to the thickness of the brake pad calculated by the pad thickness calculation unit.

10. The electric brake apparatus according to claim 9, wherein the predetermined rotational position of the electric motor is a rotational position of the electric motor corresponding to a position of the pressing member shifted from a pad contact position toward a disk rotor side by a predetermined amount, based on the pad contact position where the brake pad contacts the disk rotor.

11. The electric brake apparatus according to claim 10, wherein the pad contact position is determined based on the electric current flowing through the electric motor.

12. The electric brake apparatus according to claim 9, wherein the control unit instructs the rotational position of the electric motor according to the thrust force instruction value based on the relationship between the rotational position of the electric motor and the thrust force of the pressing member, and updates the relationship between the rotational position of the electric motor and the thrust force of the pressing member based on the estimated thrust force corresponding to the predetermined rotational position of the electric motor, which is estimated by the thrust force estimation unit.

13. The electric brake apparatus according to claim 9, wherein the control unit stores the relationship between the rotational position of the electric motor and the thrust force of the pressing member as a table.

14. The electric brake apparatus according to claim 9, wherein:

the electric current is a first electric current, the control unit supplies a second electric current to the electric motor, and the second electric current corresponds to the thrust force instruction value based on the electric current/thrust force conversion function updated by the electric current/thrust force conversion function update unit.

15. The electric brake apparatus according to claim 9, wherein the electric current/thrust force conversion function update unit updates the electric current/thrust force conversion function when the caliper is under an ambient temperature.

16. An electric brake apparatus comprising:

a caliper configured to move a pressing member by an electric motor via a transmission mechanism, to cause the pressing member to press a brake pad against a disk rotor;

a control unit configured to control the electric motor based on a thrust force instruction value of the pressing member which is calculated in response to a control instruction signal;

a rotational position detection unit configured to detect a rotational position of the electric motor; and an electric current detection unit configured to detect an electric current flowing through the electric motor, the control unit comprising, a thrust force estimation unit configured to estimate a thrust force of the pressing member from the electric current flowing through the electric motor based on an electric current/thrust force conversion function, which defines a relationship between the electric current flowing through the electric motor and the thrust force of the pressing member, an electric current/thrust force conversion function update unit configured to correct and update the electric current/thrust force conversion function by comparing an estimated thrust force corresponding to a predetermined rotational position of the electric motor, which is estimated by the thrust force estimation unit, and a reference thrust force corresponding to the predetermined rotational position of the electric motor based on a relationship between the rotational position of the electric motor and the thrust force of the pressing member, a pad thickness calculation unit configured to calculate a thickness of the brake pad based on the rotational position of the electric motor, a storage unit configured to store a rotational position/reference thrust force characteristic indicating the relationship between the rotational position of the electric motor and the thrust force of the pressing member according to the thickness of the brake pad, and a rotational position/estimated thrust force characteristic calculation unit configured to calculate a rotational position/estimated thrust force characteristic indicating the relationship between the rotational position of the electric motor and the thrust force of the pressing member based on the rotational position of the electric motor and the estimated thrust force estimated by the thrust force estimation unit when the brake pad is pressed against the disk rotor, wherein the electric current/thrust force conversion function update unit selects the rotational position/reference thrust force characteristic according to the thickness of the brake pad from the storage unit, compares the selected rotational position/reference thrust force characteristic with the rotational position/estimated thrust force characteristic calculated by the rotational position/estimated thrust force characteristic calculation unit, corrects the electric current/thrust force conversion function, and updates the electric current/thrust force conversion function stored in the storage unit.

17. The electric brake apparatus according to claim 16, wherein the predetermined rotational position of the electric motor is a rotational position of the electric motor corresponding to a position of the pressing member shifted from a pad contact position toward a disk rotor side by a predetermined amount, based on the pad contact position where the brake pad contacts the disk rotor.

18. The electric brake apparatus according to claim 16, wherein the control unit instructs the rotational position of the electric motor according to the thrust force instruction value based on the relationship between the rotational position of the electric motor and the thrust force of the pressing member, and updates the relationship between the rotational position of the electric motor and the thrust force of the pressing member based on the estimated thrust force corresponding to the predetermined rotational position of the electric motor, which is estimated by the thrust force estimation unit.

19. The electric brake apparatus according to claim 16, wherein the control unit stores the relationship between the rotational position of the electric motor and the thrust force of the pressing member as a table.

20. The electric brake apparatus according to claim 16, wherein:

the electric current is a first electric current, the control unit supplies a second electric current to the electric motor, and the second electric current corresponds to the thrust force instruction value based on the electric current/thrust force conversion function updated by the electric current/thrust force conversion function update unit.

* * * * *